United States Patent
Osborne (10) Patent No.: US 8,186,447 B2
(45) Date of Patent: May 29, 2012

(54) HORSE ORTHOTIC

(76) Inventor: Robert Clark Osborne, Lakeside, CA (US)

( * ) Notice: Subject to any disclaimer, the term of this patent is extended or adjusted under 35 U.S.C. 154(b) by 289 days.

(21) Appl. No.: 12/535,258

(22) Filed: Aug. 4, 2009

(65) Prior Publication Data
US 2010/0031614 A1 Feb. 11, 2010

Related U.S. Application Data

(60) Provisional application No. 61/086,332, filed on Aug. 5, 2008.

(51) Int. Cl.
*A01L 3/02* (2006.01)
*A01L 7/00* (2006.01)
*A01L 5/00* (2006.01)

(52) U.S. Cl. .................. 168/20; 168/4; 168/24; 168/27; 168/DIG. 1

(58) Field of Classification Search .................. 168/2, 4, 168/24, 23, 17, 20, 27, 10, 11, 12, 18, 21, 168/24.26, 28, 48.1, DIG. 1
See application file for complete search history.

(56) References Cited

U.S. PATENT DOCUMENTS

| | | | | |
|---|---|---|---|---|
| 789,598 | A | * | 5/1905 | Conn ................................. 15/89 |
| 798,598 | A | * | 9/1905 | Conn ................................. 168/18 |
| 866,127 | A | * | 9/1907 | Glassbrooke ..................... 168/28 |
| 1,212,266 | A | * | 1/1917 | Schrader ........................... 168/4 |
| 4,346,762 | A | * | 8/1982 | Tovim ............................... 168/4 |
| 4,892,150 | A | * | 1/1990 | Thoman ............................ 168/4 |
| 4,982,797 | A | * | 1/1991 | Monticello ....................... 168/4 |
| 5,042,585 | A | * | 8/1991 | Fox et al. ......................... 168/27 |
| 5,105,892 | A | * | 4/1992 | Seesholtz ......................... 168/27 |
| 5,253,715 | A | | 10/1993 | Ovnicek |
| 5,330,008 | A | | 7/1994 | Sigafoos et al. |
| 5,439,062 | A | * | 8/1995 | Ovnicek .......................... 168/14 |
| 5,636,697 | A | * | 6/1997 | Pitchford ....................... 168/48.1 |
| 5,638,905 | A | | 6/1997 | Sigafoos et al. |
| 5,699,861 | A | | 12/1997 | Sigafoos |
| 5,727,633 | A | | 3/1998 | Ovnicek |
| 6,062,008 | A | | 5/2000 | Nor |
| 6,305,328 | B1 | | 10/2001 | Marquis |
| 6,651,410 | B2 | | 11/2003 | Osha et al. |

(Continued)

OTHER PUBLICATIONS

Fleming, G., "Horse-shoes and horse-shoeing: their origin, history, uses, and abuses", p. 223.*
Treating Laminitis With the Imprint Therapeutic Shoe, Imprint + Equine Foot Care, http://www.imprintshoes.co.uk/articles/treating_laminitis_horse_health_magazine.htm (article originally appeared in Horse Health Magazine, Feb./Mar. 2006, Poynton Ltd, Wiltshire, UK).

(Continued)

*Primary Examiner* — Rob Swiatek
*Assistant Examiner* — Thien Thanh Pham
(74) *Attorney, Agent, or Firm* — Knobbe Martens Olson & Bear LLP (57) ABSTRACT

Embodiments of this invention include orthotic devices for treating hoof ailments, including laminitis and founder, and methods of treating the hoof ailments using an orthotic. In one embodiment, the hoof orthotic includes a platform having a heel end, a toe end, an inside and an outside edge, the heel end comprising a center section of the platform. The toe end includes a first tip and a second tip having a space therebetween such that the toe end is not enclosed. The platform includes an upper hoof contact surface and a lower surface, the upper surface being elevated at the heel end of the platform and sloping such that the heel end has a greater vertical height than the toe end. The orthotic also includes attachment means that extend vertically from the platform for attaching the orthotic to the animal hoof. The orthotic can be made from a resilient and/or elastomeric material that may also provide cushioning and fitting advantages.

6 Claims, 8 Drawing Sheets

U.S. PATENT DOCUMENTS

| | | | |
|---|---|---|---|
| 6,694,713 | B1 | 2/2004 | MacDonald |
| 6,761,224 | B2 | 7/2004 | McLane |
| 6,868,656 | B2 | 3/2005 | Osha et al. |
| 7,032,367 | B1 | 4/2006 | Yoho |
| 7,174,858 | B2 | 2/2007 | Ford |
| 7,178,321 | B2 | 2/2007 | Ruetenik |
| 7,207,163 | B2 | 4/2007 | Maestrini |
| 7,806,194 | B2 * | 10/2010 | Vaillant .......................... 168/24 |
| 2005/0126793 | A1 * | 6/2005 | McCuan et al. ................. 168/17 |
| 2009/0120650 | A1 * | 5/2009 | Daine ............................. 168/4 |

OTHER PUBLICATIONS

Andrews, Mark, Equine Science Update, http://www.imprintshoes.co.uk/equine_science_update.htm (article originally appeared in Equine Science Update, Apr. 2002, Poynton Ltd, Wiltshire, UK).

Craig, Monique, Shoeing Founder With Plastic Shoes, EponaShoe, http://www.eponashoe.com/Documents/ShoeFounderPlastic.htm, (article originally appeared in American Farrier's Journal, Sep./Oct. 2005 and European Farrier's Journal #115, 2005).

* cited by examiner

HORSE ORTHOTIC

RELATED APPLICATIONS

This application claims the benefit of U.S. Provisional Application No. 61/086,332, filed Aug. 5, 2008, which is hereby incorporated by reference in its entirety.

BACKGROUND

1. Field of the Invention

A device and method to facilitate the treatment of the hoof ailments laminitis and founder are provided. In particular, a secure hoof orthotic, which can be detached from a hoof with minimum trauma, that can both relieve stress and provide cushioning.

2. Description of Related Art

Veterinarians and farriers are well acquainted with the varieties of lameness problems in horses. Two particularly vexing ailments of the hoof and lower leg are laminitis and founder, both arising in the digital laminae. The digital laminae connect the hoof wall and the coffin bone and are responsible for the suspension of the animal's axial skeleton and the dissipation of impact when the animal is moving. Laminitis or founder result from trauma, inflammation and/or separation in the digital laminae, which results in partial or complete separation of the coffin bone and the inner hoof wall.

Treatment of laminitis and founder requires several aspects of the problem be considered. One is that the fever created by the founder and the accompanying trauma causes the coffin bone and the hoof wall to disconnect or separate one from the other in whole or in part. A second condition is inflammation in the laminae or inner face of the hoof wall, and the natural pull of the movement associated with contracting the leg pulls on the inflamed laminae pulling the coffin bone away from the hoof wall. Thirdly, the downward pressure resulting from the horse's own weight causes rotation or displacement of the coffin bone. This bone displacement is aggravated by pressure applied to the toe of the hoof.

Laminitis has been treated by altering the afflicted animal's diet, administering pain-killing medications, administering hoof growth stimulants, casting the afflicted leg, radically trimming the hoof, and hoof resection. Hoof pads and various types of shoes have been designed to alleviate pain to the animal caused by founder and laminitis and to assist in the treatment process. Shoes which are attached to the hoof with nails may inflict additional trauma to the horse and hinder easy access to the hoof. Strapped on pads or shoes can move relative to the hoof be unstable and not always aligned to the hoof. Accordingly, these devices have not been ideal to treat many aspects of laminitis or founder.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other hoof orthotic devices.

In one embodiment, a hoof orthotic for treating laminitis and founder in hoofed animals made of a resilient material and configured to be attached to a hoof is provided. The orthotic includes a platform having a heel end, a toe end, an inside and an outside edge, the heel end including a center section of the platform, the toe end including a first and second tip having a space therebetween such that the toe end is not enclosed, the platform having an upper hoof contact surface and a lower surface, the upper surface being elevated at the heel end of the platform and sloping such that heel end has a greater vertical height than the toe end. The hoof orthotic also includes an attachment means for attaching the hoof orthotic to the animal hoof. The orthotic can further include means for supporting a frog of the hoof, the supporting means attached to the inside edge of the platform and configured to support the frog and bone structure of the hoof. In some embodiments, the means for supporting the frog includes a triangular or other shaped protrusion extending from a center of the inside edge of the platform towards the toe end of the hoof orthotic.

The orthotic may be made of the polyurethane ST-1060 A/B. The attachment means of the orthotic can include wings attached to the outside edge of the platform. In some embodiments, the wings do not fully enclose the heel end of the orthotic. In some embodiments, the wings leave approximately twenty percent of the heel end unenclosed. The wings may be configured so that they do not enclose the toe end of the orthotic, or such that the wings do not extend further forward than the first and second tips. In some embodiments, the wings are generally angled towards a center axis of the orthotic.

The attachment means of the hoof orthotic may include adhesives applied to the upper hoof contact surface of the platform. In some embodiments, the attachment means includes adhesive film or tape, or mechanical fasteners. In other embodiments, the attachment means include straps comprising hook-and-loop-type fasteners. In some embodiments, one or more straps may hold the hoof orthotic against the hoof while adhesive applied to the upper surface of the platform fastens the orthotic to the hoof. The bottom of the hoof orthotic may be formed with a tread. The hoof orthotic may additionally include means for holding medications, salves, or other treatments against a hoof. For example, the means for holding medications, salves, or other treatments against a hoof can include a lip running along a top of the inside edge of the platform. In some embodiments, the means for holding medications, salves, or other treatments against a hoof includes one or more depressions or cuts in the upper hoof contact surface of the platform.

A method for using a hoof orthotic to treat laminitis and founder in hoofed animals is also provided. The method can include performing any desired pre-treatment such as hoof trimming or resection, and selecting a hoof orthotic, the hoof orthotic including a platform with a top surface, a heel end, and a toe end, a hoof to be treated having a bottom, a heel, and a toe. The method also includes placing the top surface of the platform against the bottom of the hoof such that the heel end of the platform is in contact with the heel of the hoof and the toe end of the platform is under the toe of the hoof; and attaching the orthotic to the hoof. In some embodiments, the toe end includes a first tip and a second tip having a space therebetween such that the toe end is not enclosed. The method can also include applying medications, salves, or other treatments to the hoof of the animal before the hoof orthotic is attached. In some embodiments, the medications, salves, or other treatments are applied to the top and other orthotic surfaces that contact the hoof before the hoof orthotic is attached to the hoof.

In some embodiments, the orthotic includes wings attached to an outside edge of the platform, and the wings do not fully enclose the heel end of the orthotic. The configuration of the orthotic can also allow medications, salves, or other treatments to be applied to the hoof through the unenclosed toe end and/or heel end after the hoof orthotic has been attached to the hoof. In some embodiments, further mechanical treatment of the hoof such as trimming or resection occurs after the hoof orthotic has been attached to the hoof. In addition, different hoof orthotics can be attached to the hoof during different phases of treatment.

In another embodiment, a hoof orthotic for treating laminitis and founder in hoofed animals and configured to be attached to a hoof is provided. The orthotic includes a platform having a heel end and a toe end, the heel end including a center section of the platform, the toe end including a first and second tip having a space therebetween such that the toe end is not enclosed, the platform having an upper hoof contact surface, the upper surface being elevated at the heel end of the platform and sloping such that the heel end has a greater vertical height than the toe end of the platform. The orthotic also includes a first attachment means that extend vertically from the platform for attaching the hoof orthotic to the animal hoof. In some embodiments, the angle of the slope of the upper surface is less than or about ten degrees.

The orthotic can also include a second attachment means that is removed after the orthotic is attached to the animal hoof by the first attachment means. In one embodiment, the second attachment means includes straps having hook-and-loop-type fasteners. Additionally, the platform can include one or more magnets. In some embodiments, the first attachment means include wings attached to an outside edge of the platform, wherein the wings do not fully enclose the heel end of the orthotic. In addition, a least a portion of the wings can have a height of approximately 2 inches to approximately 3 inches.

In another embodiment, an orthotic for hoofed animals comprises a platform having a heel end and a toe end, the heel end comprising a center section of the platform, the toe end comprising a first and second tip having a space therebetween such that the toe end is not enclosed, the platform having an upper hoof contact surface, the upper surface being elevated at the heel end of the platform and sloping such that the heel end has a greater vertical height than the toe end of the platform, and at least one wing member that extends vertically from the platform for attaching the hoof orthotic to the animal hoof. In one aspect, the angle of the slope of the upper surface is less than or about 10 degrees. In another aspect, the orthotic may further comprise two wing members each having a toe end and a heel end, and at least one strap connecting the toe ends of the two wing members. In another aspect, the at least one wing member can be attached to an outside edge of the platform such that the at least one wing does not fully enclose the heel end of the orthotic.

DETAILED DESCRIPTION OF CERTAIN EMBODIMENTS

The following description and examples illustrate preferred embodiments of the present invention in detail. Those of skill in the art will recognize that there are numerous variations and modifications of this invention that are encompassed by its scope. Accordingly, the description of a preferred embodiment should not be deemed to limit the scope of the present invention. In this description, reference is made to the drawings wherein like parts are designated with like numerals throughout.

The treatment of laminitis or founders can benefit from a holistic approach. The structure of the hoof must be supported while simultaneously stimulating blood flow to the effected leg. One method of providing structural support to hoof anatomy to prevent further injury while stimulating blood flow to and from the leg can involve use of a hoof orthotic. Although described herein in reference to a horse, such orthotics could also be used for other animals with hoofs, for example, a cow. The described orthotic decreases the pull of the deep digital flexor tendon on the coffin bone, unloading the laminar interface, reducing inflammation, easing break over, protecting tissue, and providing support for the bony column.

One embodiment of a treatment for laminitis comprises an integrated hoof orthotic. The hoof orthotic has a design which is flexible and can be made of flexible materials. The hoof orthotic can also be made of resilient and/or elastomeric materials. Additionally, this hoof orthotic can be made in a range of "standard" sizes (for example, 10 sizes) so that nearly every sized hoof falls within the size range, which increases the practicality of using the orthotic. Advantageously, embodiments of the hoof orthotic described herein can be manufactured in three or four generic sizes that fit the majority of hooves. The orthotic can be made using an injection molding process so if necessary, a custom-sized orthotic can be easily made. However, the combination of having a range of standard sizes and the orthotic's flexibility enables the animal care person to easily fit the orthotic to the hoof typically without custom manufacturing the orthotic. Also, because the integrated hoof orthotic is attached to the hoof through the use of a combination of the orthotic's flexible wings and an adhesive or adhesive strip, the orthotic can be easily removed to treat the hoof ailment. Additionally, the integrated hoof orthotic can be easily used and cheaply manufactured as it is one piece. In addition to these benefits, the integrated hoof orthotic holistically treats laminitis and founder by removing the animals weight from the toe of the hoof, by supporting the frog, by easing the tension in the flexor tendon, by encouraging blood flow in the hoof, by providing the care-person access to the afflicted hoof, and by stabilizing the bone structure inside the hoof through support of the hoof. This orthotic can be manufactured using numerous techniques and materials, examples of which are described herein.

The advantages of the hoof orthotic in providing care to the effected leg will be apparent to one skilled in the art as they read the following disclosure.

Figure 1:
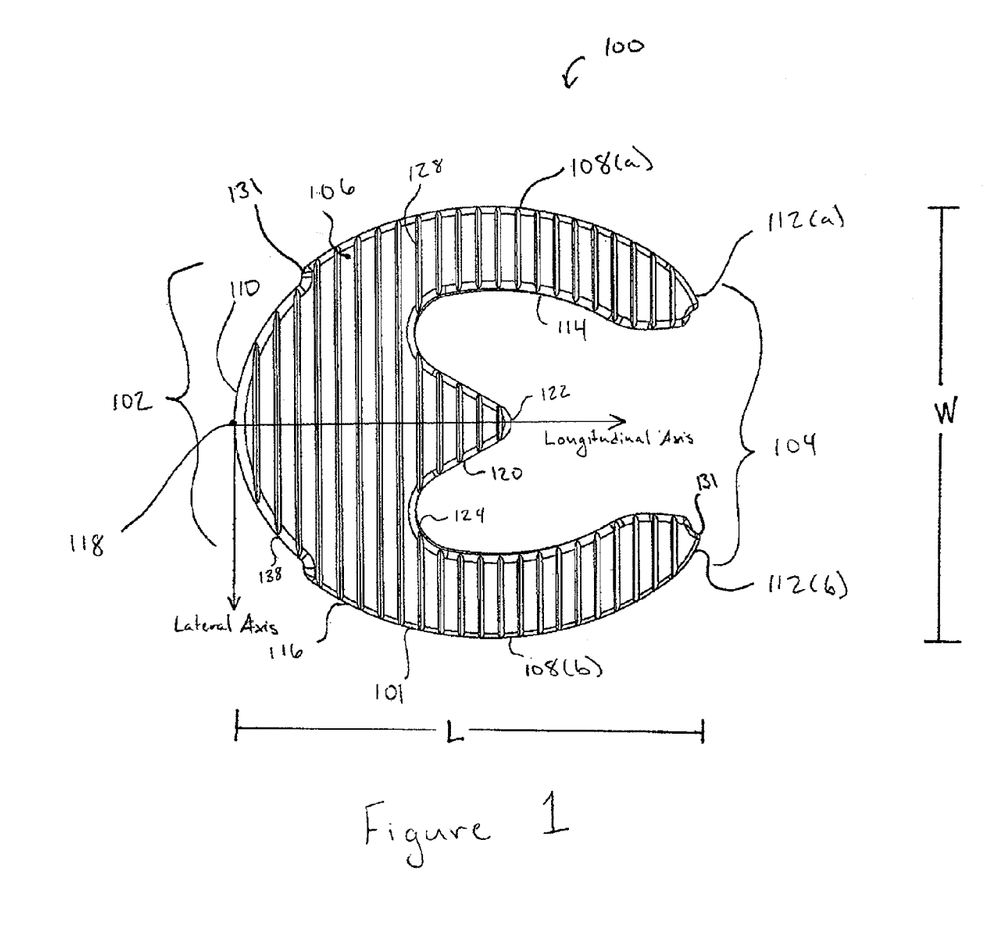
FIG. 1 is a bottom view of one embodiment of a hoof orthotic.

FIG. 1 illustrates one embodiment of a hoof orthotic 100 as shown in a bottom view. The orthotic 100 comprises a platform 101 which has a heel end 102—which is placed on the heel of the hoof, a toe end 104—which is placed on the toe of the hoof, a top (not shown here), a bottom 106, a right side

108(*a*), and a left side 108(*b*). In the illustrated embodiment of an orthotic 100 the platform 101 is configured generally "U" shaped with the central portion, or center section, 110 of the platform 101 located at the heel end 102, a first tip 112(*a*) is located at the toe end 104 of right side 108(*a*), and a second tip 112(*b*) is located at the toe end 104 of left side 108(*b*). The platform 101 also comprises an inside edge 114 and an outside edge 116.

In referring to the orthotic 100 in FIG. 1, for clarity of description, a reference point 118 is designated at the intersection of the bottom 106, the outside edge 116, and the plane located at the midpoint between right side 108(*a*) and left side 108(*b*). A "longitudinal axis" extends from this reference point 118 through the intersection of the bottom 106 and the plane located at the midpoint between right side 108(*a*) and left side 108(*b*). A "lateral axis" extends from the reference point 118 normal to the plane located at the midpoint between right side 108(*a*) and left side 108(*b*). A "vertical axis" extends from the reference point 118 normal to the plane defined by the lateral axis and the longitudinal axis, towards the top of the orthotic 100 (that is, into the page, and not shown in FIG. 1 but shown in FIG. 2). The hoof orthotic 100 can be made of flexible, resilient, and/or elastomeric material that is sturdy enough to support the horse's weight on that leg, yet also provides cushioning to help absorb some impact for a standing or walking horse. For example, in some embodiments the orthotic 100 comprises polyurethane elastomer. In one particular embodiment the orthotic 100 comprises the polyurethane ST-1060 A/B. It will be apparent to one skilled in the art that the scope of the invention is not limited to embodiments using ST-1060 A/B but also includes embodiments using other materials which provide suitable qualities of, for example, support and/or cushioning.

The shape of the orthotic 100 in FIG. 1 advantageously lends itself to healing laminitis and founder. The location of the first tip 112(*a*) and the second tip 112(*b*) at the toe end 104 results in an open toe configuration of the orthotic 100. This design removes weight from the toe of the hoof which in turn relieves the pressure on the digital laminae and eliminates concussive forces stemming from the animal's movement. This enables healing while preventing further damage to the hoof. The position of the first and second tip 112(*a*), 112(*b*) at the toe end 104 can also stabilize the coffin bone and prevent the coffin bone's movement relative to the hoof wall. This stabilization further prevents aggravation of the hoof condition while encouraging healing. Additionally, the combination of the first and second tips' 112(*a*), 112(*b*) location at the toe end 104 of the orthotic 100 and the material used to create the orthotic 100 results in a flexible orthotic. The ductility of the orthotic 100 enables the hoof to flex as it is loaded and unloaded by the animal's movements. This in turn stimulates greater blood flow to the digital laminae and encourages more complete and faster healing.

As shown in FIG. 1, an orthotic 100 additionally comprises a means for supporting the hoof frog. The means for supporting the frog can comprise a wide variety of shapes and sizes. In the illustrated embodiment, this means comprises a (generally) triangular shaped frog support 120 which is centered on the longitudinal axis. The frog support 120 protrudes from an inside edge 114 of the platform 101, and extends in the longitudinal axis direction to a forward end or point 122. The intersection of the base of the frog support 120 and the inside edge 114 of the platform 101 may have a fillet 124 to ease mechanical stresses in the orthotic 100 and to more securely attach the frog support 120 to the platform 101. The frog support 120 extends in the vertical direction, or along the vertical axis extending from the reference point 118, from the bottom 106 to a certain level on a top surface of the platform 101.

The frog support 120 furthers the healing effect of the orthotic by supporting the coffin bone and by encouraging blood flow through the hoof. The trauma to the digital laminae may weaken the connection between the coffin bone and the hoof wall, which can result in the sinking or rotation of the coffin bone. This sinking (founder) or rotation of the coffin bone can cause such serious harm to the animal that healing is not possible. The location of the frog support 120 prevents the sinking or rotation of the coffin bone by providing the bone direct structural support and holding it in its proper position. The frog support 120 additionally encourages healing by facilitating the natural blood pumping function of the frog. This increases the amount of blood circulation in the hoof which decreases the inflammation of the digital laminae and speeds healing.

The shape of the orthotic 100 also lends itself to an advantageous, close fit between the orthotic and the hoof to be fitted, allowing the orthotic to be secured firmly to the hoof and contributing to the stability of the hoof in the orthotic as the horse moves. One or more factors can contribute to the advantageous fit between the orthotic 100 and the hoof. Such factors can include, but are not limited to, the flexibility of the material from which the orthotic is manufactured; a space between the first and second tips 112(*a*), 112(*b*); a space between the frog support 120 and the tips 112(*a*), 112(*b*); and a space between the right side 108(*a*) and the left side 108(*b*). These factors can allow the first and second tips 112(*a*), 112(*b*), as well as the right side 108(*a*) and the left side 108(*b*), to be flexed toward each other in the direction of the lateral axis. Such flexing can allow the size of the orthotic 100, or the size of at least a portion of the orthotic 100, to be effectively increased or decreased to fit around different sized hooves, and to be firmly secured in place on the hoof to minimize or eliminate undesired movement (e.g., slippage) of the orthotic.

As described above, embodiments of the hoof orthotic 100 can be made in a range of "standard" sizes (for example, three or four sizes that fit the majority of hooves), plus custom sizes for hooves that fall outside the range of standard sizes. In some aspects, the orthotic 100 is between approximately 4 inches and 7 inches wide, and between approximately 4 inches and 7 inches long. In the embodiment illustrated in FIG. 1, for example, a width W of the orthotic 100 is approximately 5 5/16 inches. A length L of the orthotic 100 is approximately 5 7/8 inches.

As used herein, the term "about" or "approximately" means within an acceptable error range for the particular value as determined by one of ordinary skill in the art, which will depend in part on how the value is measured or determined, for example, the limitations of the measurement system. For example, "about" can mean within 1 or more than 1 standard deviations, per the practice in the art. Alternatively, "about" can mean a range of up to 20%, preferably up to 10%, more preferably up to 5%, and more preferably still up to 1% of a given value. In one embodiment, an approximately 6 inch length means a length that is 6 inches plus or minus 1%. In another embodiment, an approximately 6 inch length means a length that is 6 inches plus or minus 5%. Where particular values are described in the application and claims, unless otherwise stated the terms "about" and "approximately" meaning within an acceptable error range for the particular value should be assumed.

Figure 2:
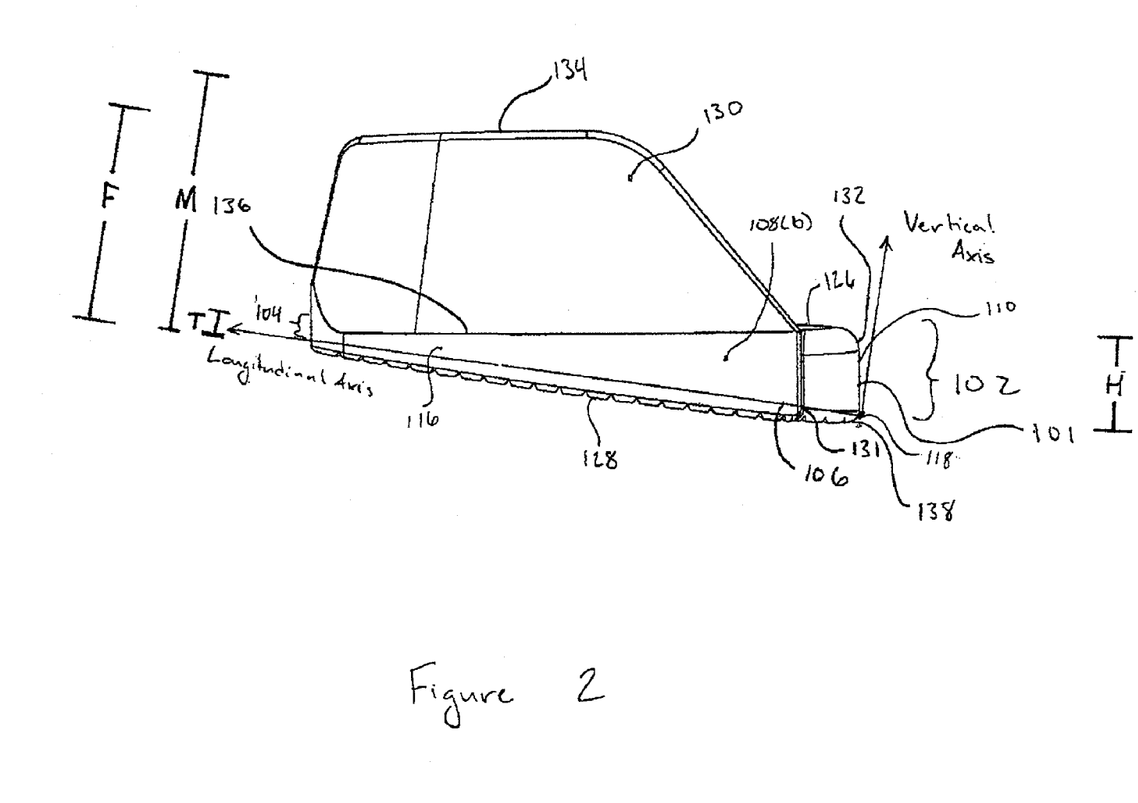
FIG. 2 is a side-view of one embodiment of a hoof orthotic.

FIG. 2 is a side view of one embodiment of an orthotic 100. The orthotic 100 comprises a platform 101 which has a heel end 102, a toe end 104, a top 126, and a bottom 106. The top 126 of the platform 101 is not parallel to the bottom 106, but is sloped such that the heel end 102 has a greater vertical height than the toe end 104 of the platform 101. The angle of the slope can vary depending of the specific treatment needs of the animal. In one embodiment, the angle of the slope is between about 1 degree and about 20 degrees. In another embodiment, the angle of the slope is about 5 degrees. In yet another embodiment, the angle of the slope is about 10 degrees. In some aspects, the heel end 102 has a vertical height that is between approximately ½ inch and approximately 1½ inches, and the toe end 104 has a vertical height that is between approximately ⅛ inch and ½ inch. In the embodiment illustrated in FIG. 2, for example, a heel end height H is approximately 1 inch; a toe end height T is approximately 3/16 inch.

The elevated heel end 102 relieves tension on the coffin bone caused by the flexor tendon. By easing this pressure, the coffin bone is stabilized and is less likely to sink or rotate. This additionally decreases strain on the digital laminae because the coffin bone is no longer being pulled away from the hoof wall by the flexor tendon. By stabilizing the coffin bone, and decreasing the strain on the digital laminae, healing is encouraged. The illustrated embodiment additionally comprises a tread 128 attached to or molded into the bottom 106. This tread increases the animal's traction and reduces the likelihood of slipping. It will be apparent to one skilled in the art that the present invention is not limited to the existence or design of a tread, but rather can be implemented with a variety of tread configurations.

Embodiments of the orthotic 100 include wings 130 described in greater detail below with reference to FIG. 3A. The wings 130 can comprise a flexible material and be advantageously dimensioned to flexibly accommodate the majority of hoof sizes. In some aspects, the wing 130 has a maximum vertical height that is between approximately 2 inches and approximately 3 inches, and a front vertical height that is between approximately 2 inches and 3 inches. In the embodiment illustrated in FIG. 2, for example, the wing 130 has a maximum vertical height M that is approximately 2⅜ inches. The wing 130 also has a front vertical height F that is approximately 2⅛ inches.

Figure 3A:
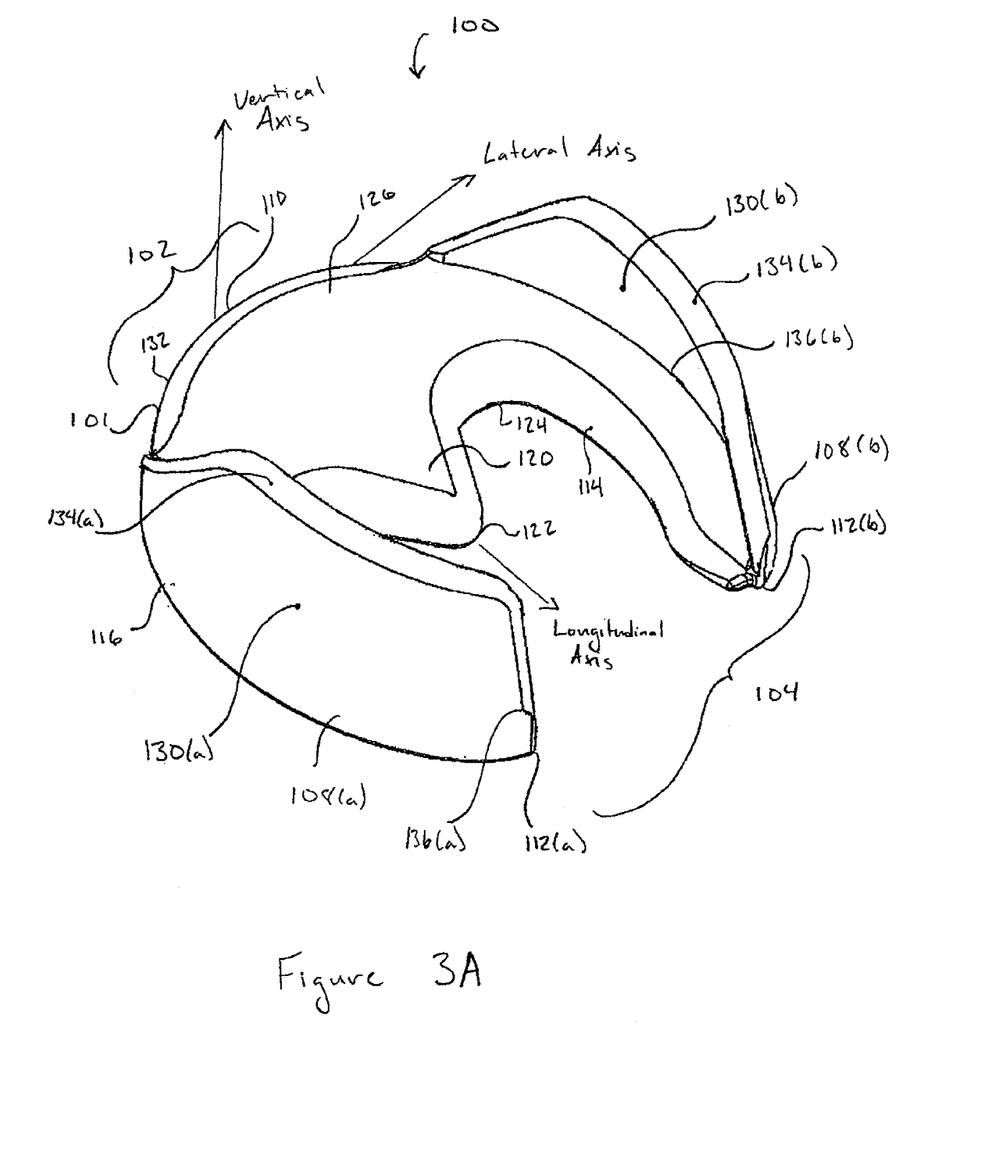
FIG. 3A is a perspective view of one embodiment of a hoof orthotic.

FIG. 3A is a perspective view of one embodiment of the hoof orthotic 100. This embodiment of the orthotic comprises a platform 101 which has a heel end 102, a toe end 104, a sloped top 126 which is higher at the heel end 102 than at the toe end 104, a bottom (not shown) 106, a right side 108(a), a left side 108(b), an inside edge 114, an outside edge 116, a first tip 112(a), and a second tip 112(b). Thus, the platform 101 has a sloped top, or upper hoof contact surface 126, and a bottom, or lower surface 106 (not shown in FIG. 3A), the upper hoof contact surface 126 being elevated at the heel end 102 of the platform 101 and sloping such that the heel end 102 has a greater vertical height than the toe end 104 of the platform 101.

This embodiment additionally comprises means for attaching the orthotic to the animal hoof. In the current embodiment, the orthotic can be attached using two wings, in other embodiments, the orthotic may be attached, or partially attached, through use of socks, straps, ties, adhesives, or mechanical fasteners (for example, hook-and-loop-type fasteners). In one embodiment, a first attachment means comprises a first wing 130(a) and a second wing 130(b). A second attachment means comprises straps having hook-and-loop type fasteners. The second attachment means can also comprise straps, ties, adhesives, or mechanical fasteners. Those of skill in the art will understand attachment means as described herein can solely comprise first and second wings 130(a), 130(b), with or without adhesives, straps, or mechanical fasteners.

The orthotic 100 can comprise at least one wing member (or "wing") to attach the orthotic 100 to a hoof. For example, a first wing 130(a) can be attached to the outside edge 116 of the right side 108(a), and a second wing 130(b) can be attached to the outside edge 116 of the left side 108(b). As illustrated in FIGS. 2 and 3A, the wings 130 extend in a vertical direction from the platform 101. In some embodiments, the wings 130 may also curve inward towards the center of the platform 101 to more closely conform to the shape of a hoof placed therebetween.

The wings 130(a), 130(b) are attached to the outside edge of sides 108(a), 108(b) from the first and second tips 112(a), 112(b) rearward towards the heel end 102 of the platform 101. Although the wings 130(a), 130(b) as shown in the illustrated embodiment do not enclose the toe end 104 of the orthotic 100, in some embodiments, the wings can enclose the toe end 104 of the orthotic 100. The wings 130(a), 130(b) as shown in the illustrated embodiment do not enclose the heel end 102 of the orthotic 100, they rather leave at least some portion of the heel end 102 open, for example, about ten percent to about forty five percent of the outside edge 116 of the heel end 108 of the orthotic 100 can be left open. In some embodiments, the wings leave approximately twenty percent of the outside edge 116 of the orthotic 100 open. This allows the orthotic 100 to support a hoof and to be fastened to the hoof along two sides but not the back, as often completely fastening to the back and side surfaces of the hoof may result in binding or tension between the two sides and the back especially when the horse moves. However, in some embodiments (not shown), the wings completely enclose the outside edge 116, which may be desirable if the horse is to remain stationary or nearly so. The wings 130(a), 130(b) can be constructed of the same material as the rest of the orthotic 100, or a different material.

The orthotic 100 may additionally comprise means for holding medications, salves, or other treatments against the hoof. These means may include a lip along the inside edge 114 extending slightly above the top 126 of the platform 101 or the use of depressions or incisions into the top 126 or the platform 101.

Still referring to FIG. 3A, the orthotic 100 can be attached to the hoof using attachment means which attach the wings 130(a), 130(b) to the corresponding side of the hoof such that the bottom of the hoof rests inside the hoof orthotic 100 and is supported by the hoof orthotic 100. The wings 130 can be attached to the sides of the hoof using one or more of an adhesive, adhesive film or tape, mechanical fastener, or other known attachment means to secure the orthotic 100 to the hoof. Different adhesives can be used for different treatment processes. For example, a light holding adhesive (or tape) can be used if it is desired to remove the orthotic shoe often for examination or access to the hoof. This advantageously eliminates the necessity of using traditional methods of attachment such as hammer and nails which can irritate an injured hoof. Additionally, this allows a person who is treating the hoof to easily remove the orthotic 100 to apply medication to, to trim, to examine, or to otherwise care for the hoof. Stronger adhesives can be used if it is desired to keep the orthotic shoe 100 in place for a longer period. Further, the combination of the wings 130(a), 130(b) and the top, or upper hoof contact surface, 126 create a platform that can hold medications, salves, or other treatments against the afflicted hoof, enabling the care-person to better treat the hoof disease. This function can be enhanced, as mentioned above, through the addition of a lip or depression to the orthotic 100. Also, the use of wings 130(a), 130(b) which do not completely enclose the hoof capsule, for example in orthotics that include the space between the first and second tip 112(a), 112(b), enable radical laminitis treatments such as hoof resection.

The hoof orthotic 100 illustrated in FIG. 3A can be used to facilitate applying any desired medications or salves to the hoof or to the top 126 and wings 130 of the orthotic 100. The orthotic 100 can then be placed with top 126 against the bottom of the injured hoof. The orthotic 100 should be oriented such that the heel end 102 of the orthotic 100 is under the heel of the hoof, and the toe end 104 of the orthotic 100 is under the toe of the hoof. When the orthotic 100 is placed with the top 126 against the bottom of the hoof, the wings 130 should extend vertically and at least partially enclose the hoof, leaving the toe and the heel of the hoof exposed. The orthotic 100 can then be held in place through the use of adhesives, adhesive films, or mechanical fasteners which secure the wings 130 to the hoof wall. The orthotic 100 can be removed to facilitate the application of new medications or treatments, to replace the used orthotic with a new orthotic, or few several other reasons. Although this is one method of using the orthotic 100 to treat laminitis and founder, it will be apparent to one skilled in the art that it can be employed in other manners, and used to treat other hoof ailments.

The hoof orthotic 100 can additionally be used to treat laminitis or founder in phases. Correlated to the needs of the animal, the size, height, flexibility, slope of the top surface 126, and space between the first and second tips 112(a), 112(b) can be varied. This could be done by using different integrated orthotics 100 for different phases of treatment.

Figure 3B:
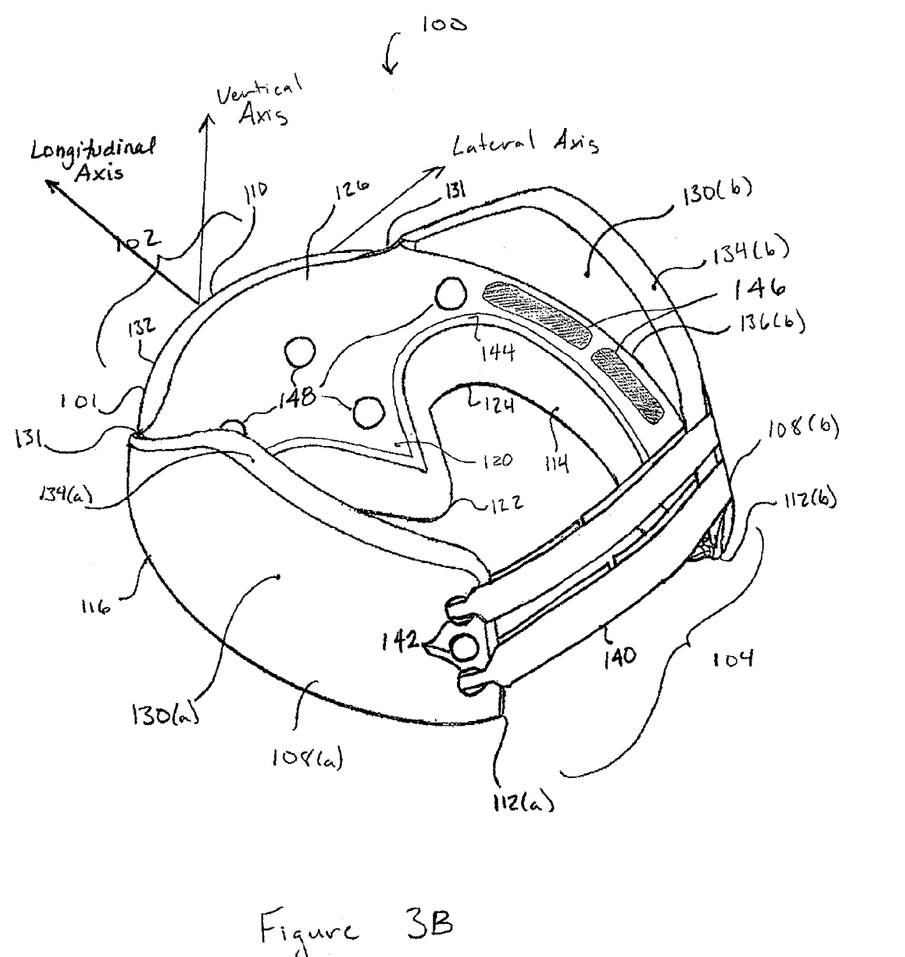
FIG. 3B is a perspective view of another embodiment of a hoof orthotic.

Referring now to FIG. 3B, the orthotic can include fasteners 140 located on the wings 130(a), 130(b) at the toe end 104 of the orthotic. The fasteners can be temporary or permanent. For example, in the embodiment illustrated in FIG. 3B, the fasteners are straps of material comprising hook-and-look-type fasteners. The straps are threaded through holes 142 located on the toe-end of both wings 130(a), 130(b). It will be understood that the wings 130(a), 130(b) can comprise a plurality of holes 142, allowing the user to reposition the fasteners 140 to different positions on the orthotic 100 in order to accommodate the particular hoof being fitted. The fasteners 140 can be used, for example, to hold the orthotic 100 securely in place while another fastener, for example a glue located on the inside surfaces of the wings 130(a), 130(b), dries. After the glue dries and the orthotic 100 is secured to the hoof, the fasteners 140 can be optionally removed. Alternatively, the fasteners can be left in place during the duration of use. In another embodiment, the orthotic 100 includes fasteners 140 that are integrated into the wings 130(a), 130(b) such that they cannot be repositioned or temporarily removed. In some embodiments, fasteners (not shown) can be used to connect the heel-end of the wings 130(a), 130(b), in other words, a portion of the wings 130(a), 130(b) that is located near the heel end of the orthotic 100.

As described above, the orthotic 100 may additionally comprise means for holding medications, salves, or other treatments against the hoof. Referring again to the embodiment of FIG. 3B, these means may include a lip 144 along the inside edge 114 extending slightly above the top 126 of the platform 101. In another embodiment, the means include depressions or incisions 146 in the top 126 or the platform 101.

Embodiments of the orthotic described herein can additionally comprise one or more magnets located in the platform 101. In the embodiment illustrated in FIG. 3B, for example, four magnets 148 are positioned in the top, or upper hoof contact surface, 126 to provide magnet therapy. Combined, the magnets can provide approximately 20 to 25 pounds of magnetic pull force.

The use of magnets in the orthotic 100 can be advantageous because subjecting the hoof to magnetic fields produced by permanent static magnets 148 can have beneficial healing effects. For example, magnets 148 can help to circulate blood by interacting with iron in hemoglobin, a component of red blood cells. Magnets therapy can also contribute to the healing of wounds, or restore the animal's energy balance, leading to increased energy and vitality. Persons of skill in the art will understand that the number and placement of magnets are not limited to those illustrated, and that the orthotic 100 need not comprise magnets.

Figure 4:
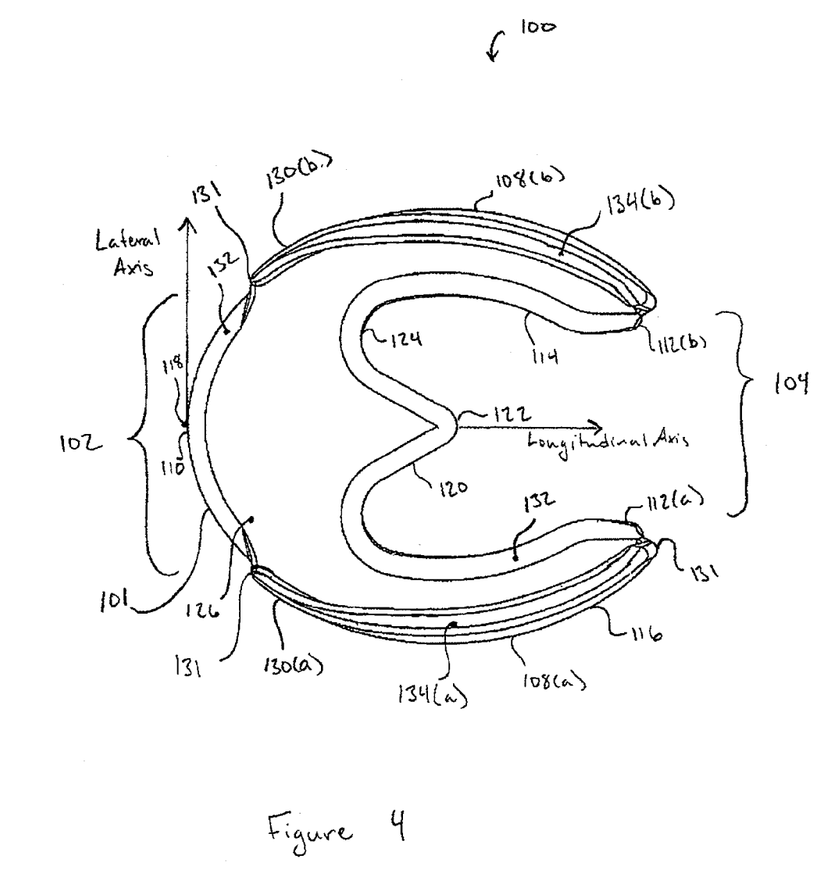
FIG. 4 is a top-view of one embodiment of a hoof orthotic.

FIG. 4 is a top view of one embodiment of the integrated hoof orthotic 100. This embodiment of the integrated hoof orthotic comprises a heel end 102, a toe end 104, a right side 108(a), a left side 108(b), a frog support 120, a frog support tip 122, a fillet 124, a first wing 130(a), a second wing 130(b), and a platform 101 which has a first tip 112(a), a second tip 112(b), an inside edge 114, an outside edge 116, and a top 126. This embodiment also comprises a rounded surface 132 that rounds the corner between the top 126 and the inside 114 and outside 116 edges. This rounded surface 132 can increase the durability of the integrated orthotic 100. The rounded surface 132 additionally makes the orthotic 100 more comfortable by removing the sharp edge. It will be understood that the orthotic need not include the rounded surface 132, however, and the inside edge 114 can extend substantially perpendicularly to the top 126.

Figure 5:
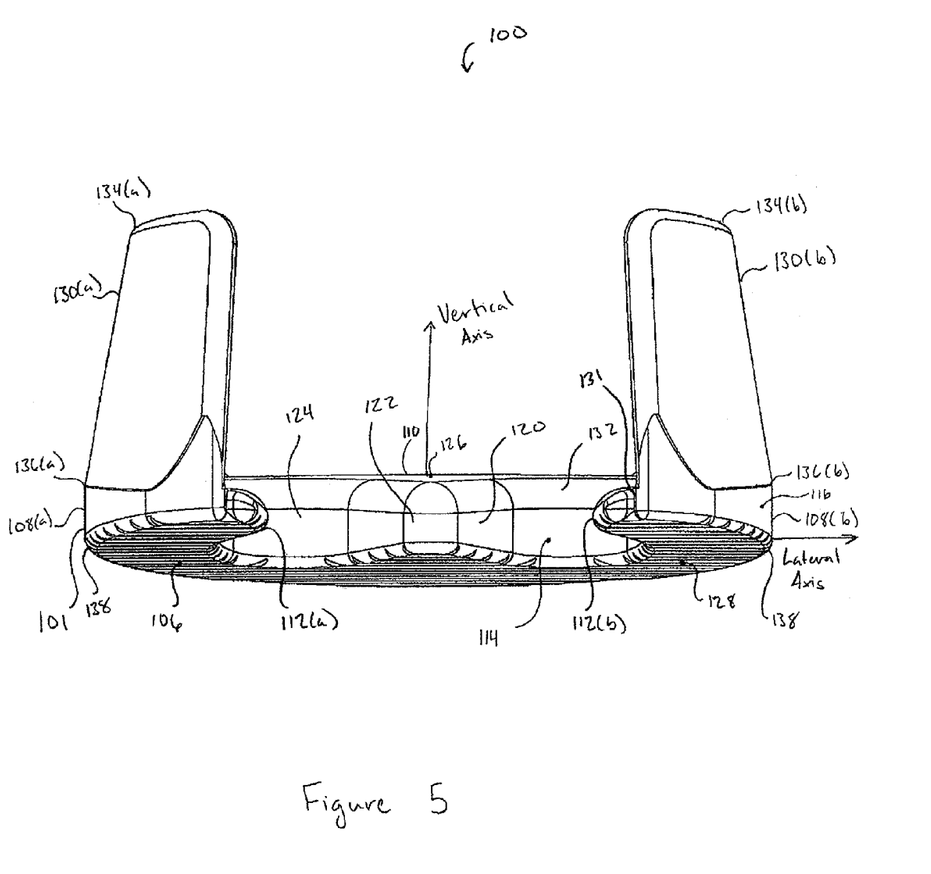
FIG. 5 is a front-view of one embodiment of a hoof orthotic.

FIG. 5 is a front view of one embodiment of the integrated hoof orthotic 100. This embodiment comprises a bottom 106, a right side 108(a), a left side 108(b), a frog support 120, a frog support tip 122, a fillet 124, a first wing 130(a), a second wing 130(b), a first top edge 134(a), a second top edge 134(b), a first bottom edge 136(a), a second bottom edge 136(b), and a platform 101 which has a first tip 112(a), a second tip 112(b), a top 126, and a rounded surface 132. The illustrated embodiment depicts how the wings 130(a), 130(b) can be inwardly angled such that the top edges 134(a), 134(b) are closer to the mid-plane running between the right and left sides 108(a), 108(b) than the bottom edges of the wings 136(a), 136(b). This inward angle can be controlled to more closely fit hoof anatomy and thus ease the attachment and use of the integrated orthotic 100. Additionally, the wings 130(a), 130(b) of the integrated hoof orthotic 100 can be made of the same material as the other portions of the orthotic 100. This material can be flexible to enable the wings to flexibly conform to the shape of the hoof. This flexible fit enables the care person to use the integrated orthotic 100 on many different animals.

Figure 6:
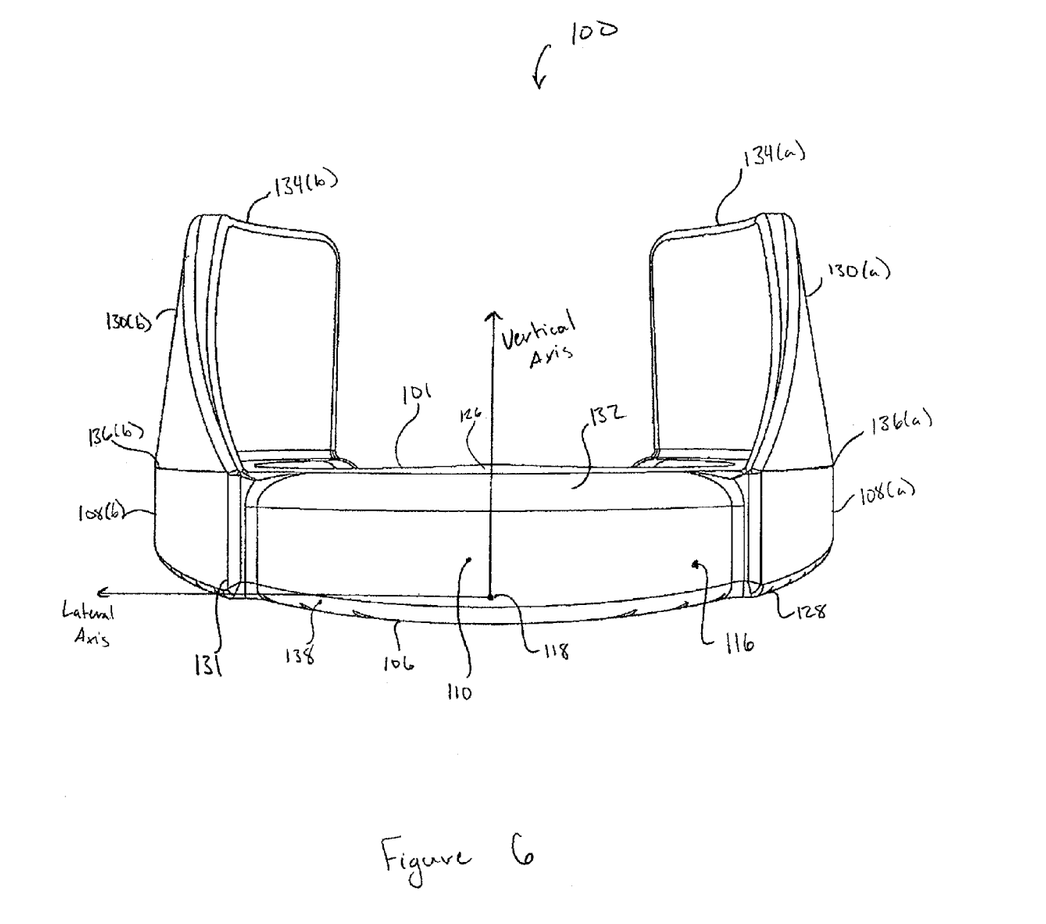
FIG. 6 is a back-view of one embodiment of a hoof orthotic.

FIG. 6 is a back view of one embodiment of the hoof orthotic 100. The illustrated embodiment of the orthotic 100 comprises a right side 108(a), a left side 108(b), a first wing 130(a), a second wing 130(b), and a platform which has a bottom 106, a top 126, a rounded edge 132, and a round 138 on the edge between the bottom 106 and the outside edge 116. This round 138 can increase the durability of the orthotic 100 and increases the comfort of the animal wearing the orthotic 100 by removing sharp edges that may impair the natural walking motion of the animal.

Figure 7:
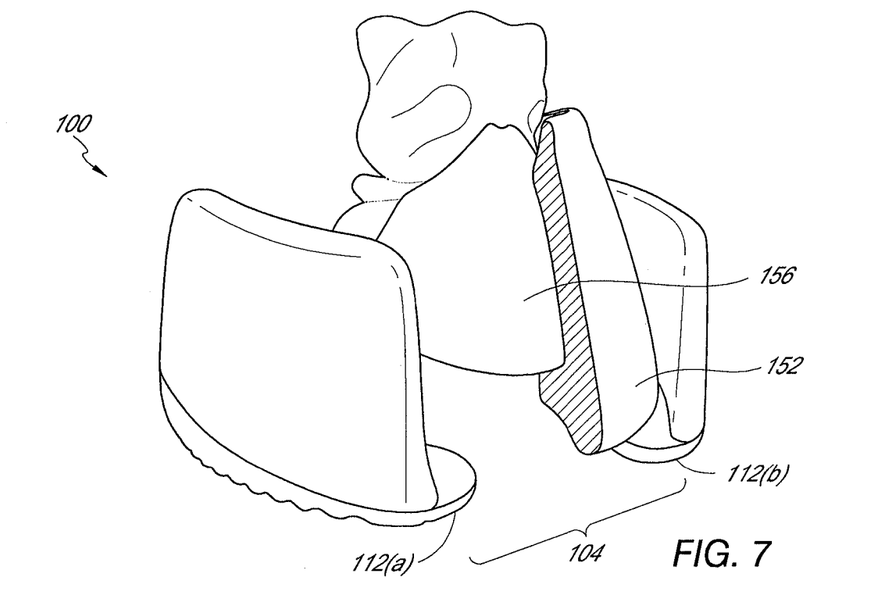
FIG. 7 is a front-view of one embodiment of a hoof orthotic in use.
Figure 8:
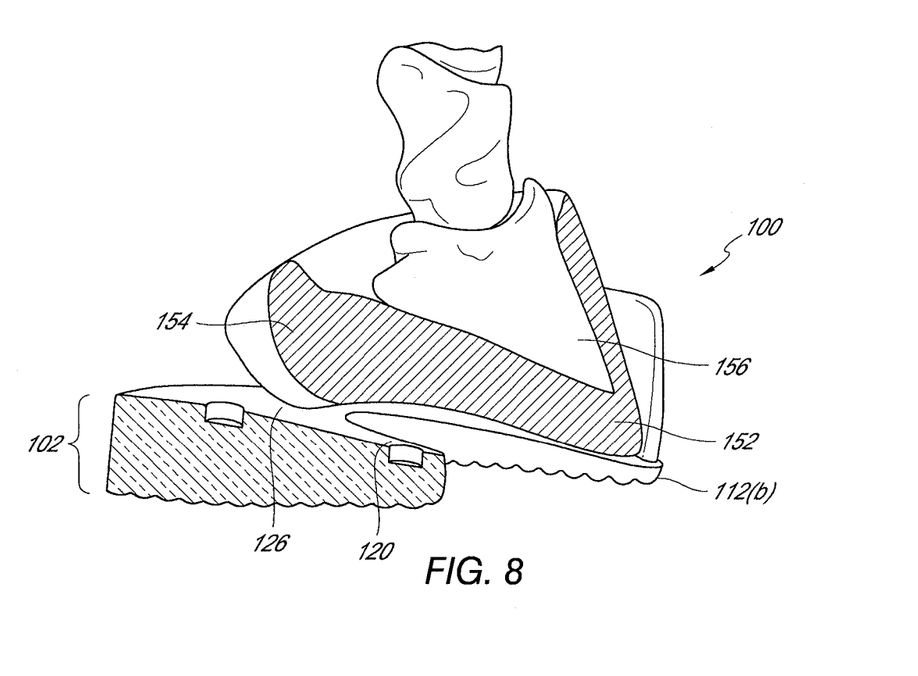
FIG. 8 is a side-view of one embodiment of a hoof orthotic in use.

FIGS. 7 and 8 are front and side views, respectively, of one embodiment of the orthotic 100 in use. For ease of viewing, a hoof wall 150 is shown in cross-section in FIG. 7, and the orthotic 100 and the hoof wall 150 are shown in cross-section in FIG. 8. As described in greater detail above, the first tip 112(a) and the second tip 112(b) are located at the toe end 104, resulting in an open toe configuration of the orthotic 100.

When the orthotic 100 is fitted over the hoof, the toe 152 of the hoof is located at the toe end 104 of the orthotic 100. As illustrated in FIG. 8, the upper hoof contact surface 126 is elevated at the heel end 102, such that the heel 154 of the hoof is elevated relative to the toe 152 of the hoof. A frog of the hoof is not shown in FIG. 8, but persons of skill in the art will understand the frog support 120 can advantageously support the frog and bone structure of the hoof, as described in greater detail above.

This design removes at least a portion of the weight from the toe of the hoof, which in turn relieves at least a portion of the pressure on the digital laminae and eliminates or substantially reduces concussive forces stemming from the animal's movement. This enables healing while preventing further damage to the hoof. The position of the first and second tip 112(a), 112(b) at the toe end 104 can also stabilize the coffin bone 156 and prevent the coffin bone's movement relative to the hoof wall. This stabilization further prevents aggravation of the hoof condition while encouraging healing.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for using a hoof orthotic to treat laminitis and founder in hoofed animals by removing the animal's weight from a toe of a hoof and supporting a frog of the hoof to decrease tension of a flexor tendon in the hoof and stimulating blood flow to the hoof, comprising:
   determining an animal's hoof has laminitis and founder;
   selecting a monolithic hoof orthotic to treat the laminitis and founder by removing the animal's weight from the toe of the hoof and supporting a frog of the hoof, the hoof orthotic comprising a platform having a heel end and a toe end, the heel end comprising a center section of the platform, the toe end comprising a first and second tip having a space therebetween such that the toe end is open and such that the monolithic orthotic does not support the toe end of the hoof when the monolithic orthotic is attached to the hoof, the platform having an upper hoof contact surface, the upper surface being elevated at the heel end of the platform and sloping such that the heel end has a greater vertical height than the toe end of the platform, and at least one wing member that extends vertically from the platform for attaching the hoof orthotic to the hoof;
   placing the upper hoof contact surface of the platform against the bottom of the hoof such that the heel end of the platform is in contact with the heel of the hoof and the open toe end of the platform is under the toe of the hoof; and
   attaching the orthotic to the hoof using the at least one wing member;
   wherein removing the animal's weight from the toe of the hoof and supporting the frog eases tension in the flexor tendon and increases blood circulation in the hoof to treat the laminitis and founder.

2. The method of claim 1, wherein medications, salves, or other treatments are applied to the hoof of the animal before the hoof orthotic is attached.

3. The method of claim 1, wherein medications, salves, or other treatments are applied to the top and other orthotic surfaces that contact the hoof before the hoof orthotic is attached to the hoof.

4. The method of claim 1, wherein medications, salves, or other treatments are applied to the hoof through the open toe end and/or heel end after the hoof orthotic has been attached to the hoof.

5. The method of claim 1, wherein further mechanical treatment of the hoof such as trimming or resection occurs after the hoof orthotic has been attached to the hoof.

6. The method of claim 1, wherein different hoof orthotics are attached to the hoof during different phases of treatment to facilitate the application of medications.

* * * * *